(12) United States Patent
Doak

(10) Patent No.: US 10,131,507 B1
(45) Date of Patent: Nov. 20, 2018

(54) EJECTOR HOOD

(71) Applicant: MSS, Inc., Nashville, TN (US)

(72) Inventor: Arthur G. Doak, Nashville, TN (US)

(73) Assignee: MSS, Inc., Nashville, TN (US)

( * ) Notice: Subject to any disclaimer, the term of this patent is extended or adjusted under 35 U.S.C. 154(b) by 0 days.

(21) Appl. No.: 15/661,180

(22) Filed: Jul. 27, 2017

(51) Int. Cl.
| | | |
|---|---|---|
| *B65G 53/42* | (2006.01) | |
| *B65G 53/60* | (2006.01) | |
| *B65G 53/16* | (2006.01) | |
| *B65G 53/44* | (2006.01) | |
| *B07B 4/02* | (2006.01) | |

(52) U.S. Cl.
CPC ............ *B65G 53/60* (2013.01); *B07B 4/02* (2013.01); *B65G 53/16* (2013.01); *B65G 53/44* (2013.01)

(58) Field of Classification Search
CPC ...... B65G 53/42; B65G 53/50; B65G 47/525; B65G 69/0491; B07B 4/02; B07B 4/025; B07B 7/02
USPC ........... 406/82, 157, 168; 198/438; 209/143, 209/644, 932
See application file for complete search history.

(56) References Cited

U.S. PATENT DOCUMENTS

| | | | | |
|---|---|---|---|---|
| 2,222,861 A | * | 11/1940 | Stoner | ........................ B07B 4/02 209/135 |
| 2,824,665 A | | 2/1958 | Lamouria et al. | |
| 2,978,103 A | * | 4/1961 | Cowher, Sr. | .............. B07B 4/02 209/135 |
| 3,240,335 A | | 3/1966 | Vandenhoeck et al. | |
| 3,300,902 A | | 1/1967 | Dockery et al. | |
| 3,329,469 A | | 7/1967 | Stadelman et al. | |
| 3,384,233 A | | 5/1968 | Elmer et al. | |
| 3,471,013 A | | 10/1969 | Haver | |
| 3,655,043 A | * | 4/1972 | Wochnowski | ............ A24B 5/10 209/138 |
| 3,685,651 A | * | 8/1972 | Gruber | ...................... B07B 4/02 209/133 |
| 3,738,483 A | * | 6/1973 | MacKenzie | ............... B03B 9/06 209/137 |
| 3,856,217 A | * | 12/1974 | Brewer | ................. B02C 13/286 209/135 |
| 3,878,091 A | * | 4/1975 | Hukki | ....................... B07B 7/08 209/135 |
| 3,917,567 A | * | 11/1975 | Barrett | ...................... B07B 4/02 209/138 |

(Continued)

OTHER PUBLICATIONS

Drawing of prior art downward ejection system (updated but admitted to be prior art).

*Primary Examiner* — Joseph A Dillon, Jr.
(74) *Attorney, Agent, or Firm* — Lucian Wayne Beavers; Patterson Intellectual Property Law, PC

(57) ABSTRACT

An ejection hood apparatus includes a transfer conduit and a hood. The transfer conduit includes a downwardly concave control shell. An inlet end portion of the transfer conduit receives an upwardly directed transfer air stream including ejected material with at least a partially upward trajectory. The hood defines an ejection chamber including a lower chamber portion and an upper chamber portion. The lower chamber portion receives the transfer air stream from an outlet end portion of the transfer conduit with at least a partially downward trajectory. The hood includes at least one air outlet passage communicated with the upper chamber portion for exhausting at least a portion of the transfer air stream.

13 Claims, 4 Drawing Sheets

(56) References Cited

U.S. PATENT DOCUMENTS

| | | | |
|---|---|---|---|
| 4,002,462 A * | 1/1977 | Maddox | B02C 18/062 209/137 |
| 4,069,145 A | 1/1978 | Sommer, Jr. et al. | |
| 4,132,634 A * | 1/1979 | Rumpf | B07B 4/025 209/136 |
| 4,137,155 A * | 1/1979 | Clin | B07B 4/02 209/134 |
| 4,222,859 A | 9/1980 | Medlock | |
| 4,304,661 A * | 12/1981 | Nelson | B07B 4/02 209/146 |
| 4,405,451 A * | 9/1983 | Roman | B03B 1/02 209/136 |
| 4,465,194 A * | 8/1984 | Coleman | A24B 5/10 209/138 |
| 4,533,053 A | 8/1985 | Kenny et al. | |
| 4,533,054 A | 8/1985 | Sommer, Jr. et al. | |
| 4,541,530 A | 9/1985 | Kenny et al. | |
| 4,609,108 A | 9/1986 | Hristozov et al. | |
| 4,618,415 A * | 10/1986 | Vecchio | A24B 5/10 131/109.2 |
| 4,627,447 A * | 12/1986 | Brackmann | A24B 1/04 131/109.1 |
| 4,718,559 A | 1/1988 | Kenny et al. | |
| 4,840,727 A * | 6/1989 | Humphrey | B02B 1/02 209/134 |
| 5,297,667 A | 3/1994 | Hoffman et al. | |
| 5,318,172 A | 6/1994 | Kenny et al. | |
| 5,339,964 A | 8/1994 | Gray et al. | |
| 5,348,136 A | 9/1994 | Kenny et al. | |
| 5,358,121 A * | 10/1994 | Robak | B07B 4/02 209/137 |
| 5,409,118 A * | 4/1995 | Bielagus | B07B 4/02 209/136 |
| 5,411,142 A * | 5/1995 | Abbott | B07B 4/02 209/139.1 |
| 5,460,271 A | 10/1995 | Kenny et al. | |
| 5,579,920 A * | 12/1996 | Garabedian | B07B 4/02 209/139.1 |
| 5,607,061 A * | 3/1997 | Felden | B07B 4/02 209/139.1 |
| 5,645,171 A * | 7/1997 | Felden | B07B 4/02 209/139.1 |
| 5,769,333 A * | 6/1998 | Kimura | B02C 13/282 241/101.2 |
| 5,966,217 A | 10/1999 | Roe et al. | |
| 5,967,333 A * | 10/1999 | Smith | B07B 4/02 209/135 |
| 6,064,056 A | 5/2000 | Doak | |
| 6,137,074 A | 10/2000 | Doak et al. | |
| 6,144,004 A | 11/2000 | Doak et al. | |
| 6,250,472 B1 | 6/2001 | Grubbs et al. | |
| 6,286,655 B1 | 9/2001 | Grubbs et al. | |
| 6,369,882 B1 | 4/2002 | Bruner et al. | |
| 6,374,998 B1 | 4/2002 | Grubbs et al. | |
| 6,446,813 B1 * | 9/2002 | White | B03B 9/06 209/233 |
| 6,497,324 B1 | 12/2002 | Doak et al. | |
| 6,500,062 B1 * | 12/2002 | Harris | A01D 45/10 460/79 |
| 6,504,124 B1 | 1/2003 | Doak | |
| 6,543,619 B1 | 4/2003 | Doak et al. | |
| 6,570,653 B2 | 5/2003 | Bruner et al. | |
| 6,631,808 B2 * | 10/2003 | Sparks | B07B 4/02 209/135 |
| 6,778,276 B2 | 8/2004 | Bruner et al. | |
| 6,883,668 B1 * | 4/2005 | Lindsey | B07B 4/02 209/132 |
| 6,891,119 B2 | 5/2005 | Grubbs et al. | |
| 6,951,285 B1 * | 10/2005 | Anderson | B07B 4/02 209/143 |
| 7,019,822 B1 | 3/2006 | Doak et al. | |
| 7,173,709 B2 | 2/2007 | Doak et al. | |
| 7,326,871 B2 | 2/2008 | Kenny et al. | |
| 7,499,172 B2 | 3/2009 | Doak et al. | |
| 7,614,120 B2 * | 11/2009 | Isbell | B07B 1/28 19/41 |
| 7,816,616 B2 | 10/2010 | Kenny et al. | |
| RE42,090 E | 2/2011 | Bruner et al. | |
| 7,893,378 B2 | 2/2011 | Kenny | |
| 7,994,448 B2 | 8/2011 | Kenny | |
| 8,312,994 B2 * | 11/2012 | Schneider | B07B 4/02 209/138 |
| 8,411,276 B2 | 4/2013 | Doak et al. | |
| 8,809,718 B1 | 8/2014 | Doak et al. | |
| 8,812,149 B2 | 8/2014 | Doak | |
| 9,050,629 B2 * | 6/2015 | Thielepape | B07B 4/02 |
| 2001/0032806 A1 * | 10/2001 | Flores | B07B 4/02 209/138 |
| 2004/0035763 A1 * | 2/2004 | Kokko | B07B 4/02 209/638 |
| 2010/0159247 A1 * | 6/2010 | Kaya | B02C 23/12 428/402 |
| 2011/0068051 A1 * | 3/2011 | Brasseur | B07B 4/02 209/137 |
| 2011/0315606 A1 * | 12/2011 | Cox | B07B 4/02 209/139.1 |
| 2014/0216991 A1 * | 8/2014 | Suhin | B07B 4/02 209/644 |
| 2014/0346098 A1 * | 11/2014 | Thielepape | B07B 4/02 209/639 |
| 2014/0353219 A1 * | 12/2014 | Kosilov | B07B 4/02 209/644 |
| 2015/0037104 A1 * | 2/2015 | Levy | A24B 3/16 406/160 |
| 2015/0108042 A1 * | 4/2015 | Gitschel | B02C 23/08 209/44 |
| 2015/0246374 A1 * | 9/2015 | Bouslog | B07B 4/02 209/639 |
| 2016/0175889 A1 * | 6/2016 | Yamaguchi | B07C 5/34 209/644 |

* cited by examiner

EJECTOR HOOD

BACKGROUND OF THE INVENTION

1. Field of the Invention

The present invention relates generally to a material handling conduit, and particularly to an ejection hood useful for transferring an airborne stream of ejected material from one conveyor to a second conveyor.

2. Description of the Prior Art

Modern-day municipal recycling centers are designed to separate a mixed stream of household and office waste material which includes various fiber-based materials such as office paper, newspaper, cardboard, and the like from non-fiber material such as, for example, plastic bags, plastic bottles, glass and the like.

Typically the mixed stream of materials is carried by a high-speed primary conveyor and is spread out on the conveyor into a stream of material substantially one layer thick.

The moving stream of mixed waste material is optically examined with high-speed optical sensors, and then the stream of materials is launched from the first conveyor and is separated into two or more streams through the use of arrays of air jet nozzles aimed so as to direct the selected items along various paths into two or more streams downstream of the primary conveyor.

One problem that is often encountered when conveying lightweight materials entrained in an airstream is the control of the trajectory of the lightweight materials which may be buffeted by various swirling or turbulent flows of the airstream as it moves from one airspace into a differently configured airspace. The effect can be somewhat like trying to fill a bucket with a stream of water from a fire hose wherein the stream of water enters the bucket, and then immediately is blown back out of the bucket due to the high speed stream of water being deflected off the bottom of the bucket.

Accordingly, there is a need for specially designed systems for controlling such airflow and the flow of the articles entrained in the airflow.

SUMMARY OF THE INVENTION

In one aspect, an ejection hood apparatus includes a transfer conduit including a downwardly concave control shell, the transfer conduit including an inlet end portion and an outlet end portion. The inlet end portion may be configured to receive an upwardly directed transfer air stream including ejected material with at least a partially upward trajectory. The apparatus further includes a hood defining an ejection chamber. The ejection chamber includes a lower chamber portion and an upper chamber portion located above the lower chamber portion. The lower chamber portion includes a chamber inlet for receiving the transfer airstream from the outlet end portion of the transfer conduit with at least a partially downward trajectory. The lower chamber portion further includes a lower chamber outlet located lower than the chamber inlet. The hood includes at least one air outlet passage communicated with the upper chamber portion for exhausting at least a portion of the transfer airstream.

An outlet conveyor may be received below the chamber outlet. The hood and transfer conduit may be configured such that the transfer airstream flows downwardly and laterally through the chamber inlet toward the chamber outlet and is at least partially deflected from the outlet conveyor back up into the upper chamber portion, thereby creating a swirling flow in the upper chamber portion above the outlet conveyor. Ejected material caught up in the swirling flow drops back down through the lower chamber portion onto the outlet conveyor without being blown back into the transfer conduit.

The transfer conduit may include a conduit floor located below the control shell and sloped downwardly toward the ejection chamber. The conduit floor and control shell, at least in part define a conduit outlet communicated with the chamber inlet.

The hood may include an upper hood portion in part overlying the downwardly concave control shell and in part overlying the chamber outlet.

The upper hood portion may be at least in part formed of perforated metal plate having a plurality of perforations defining the air outlet passages of the hood.

The upper hood portion may be downwardly concave.

The control shell may be impervious to air so that there is no air flow across the control shell.

The chamber inlet may be a laterally open chamber inlet, and the transfer conduit and the laterally open chamber inlet may be configured to direct the transfer air stream downwardly and laterally through the chamber inlet into the lower chamber portion.

The chamber inlet may be a downwardly open chamber inlet, and the transfer conduit and the downwardly open chamber inlet may be configured to direct the transfer air stream primarily downwardly into the lower chamber portion adjacent one end of the lower chamber portion.

The lower chamber portion may include an upwardly concave chamber floor, the chamber outlet being defined in a lower portion of the upwardly concave chamber floor.

The at least one air outlet may include an exhaust duct extending from the hood.

The apparatus may further include a primary sorting conveyor arranged to deliver a stream of material to be sorted in a layer of objects substantially one object thick. An upwardly directed air nozzle ejector array may be arranged to eject from the stream of material ejected materials into an inlet end of the transfer conduit, thereby creating the transfer airstream, including the ejected material.

In another embodiment, a method of transferring material entrained in an airstream is provided. The method comprises the steps of:

(a) providing on a conveyor a stream of material to be sorted;
(b) launching the stream of material off of the conveyor thus creating an airborne stream of material;
(c) ejecting material from the airborne stream of material with a nozzle array directed at least partially upwardly thereby creating a transfer air stream including entrained material;
(d) directing the transfer air stream including entrained material at least partially downwardly through a chamber inlet into a receiving chamber;
(e) creating a swirling air flow of the transfer air stream in the receiving chamber so that the swirling air flow does not flow back through the chamber inlet;
(f) dropping entrained material out of the swirling air flow downward through a chamber outlet; and
(g) relieving at least some of the swirling air flow through an airflow outlet defined in an upper portion of the receiving chamber.

In step (d) the transfer airstream may be directed downwardly and laterally through the chamber inlet into the receiving chamber.

The transfer airstream may be at least partially deflected from the outlet conveyor back up into the upper chamber portion of the receiving chamber, thereby creating the swirling airflow in the upper portion of the receiving chamber above the outlet conveyor so that entrained material caught up in the swirling airflow drops back onto the outlet conveyor without being blown back through the chamber inlet.

In step (g) the upper portion of the receiving chamber may be defined by a hood, and the airflow outlet may be defined by a plurality of perforations in the hood.

In step (g) the upper portion of the receiving chamber may be defined by a hood, and the airflow outlet may be defined by an exhaust duct communicated with the hood.

The step (g) may further comprise directing the transfer airstream, including the ejected material with a transfer conduit, the transfer conduit including a downwardly concave control shell, the control shell being impervious to air so that there is no airflow across the control shell. The transfer conduit may further include a conduit floor located below the control shell and sloped downwardly toward the ejection chamber, the conduit floor and control shell, at least in part defining a conduit outlet communicated with the chamber inlet.

Numerous objects, features and advantages of the present invention will be readily apparent to those skilled in the art upon reading of the following disclosure when taken in conjunction with the accompanying drawings.

DETAILED DESCRIPTION

Figure 1:
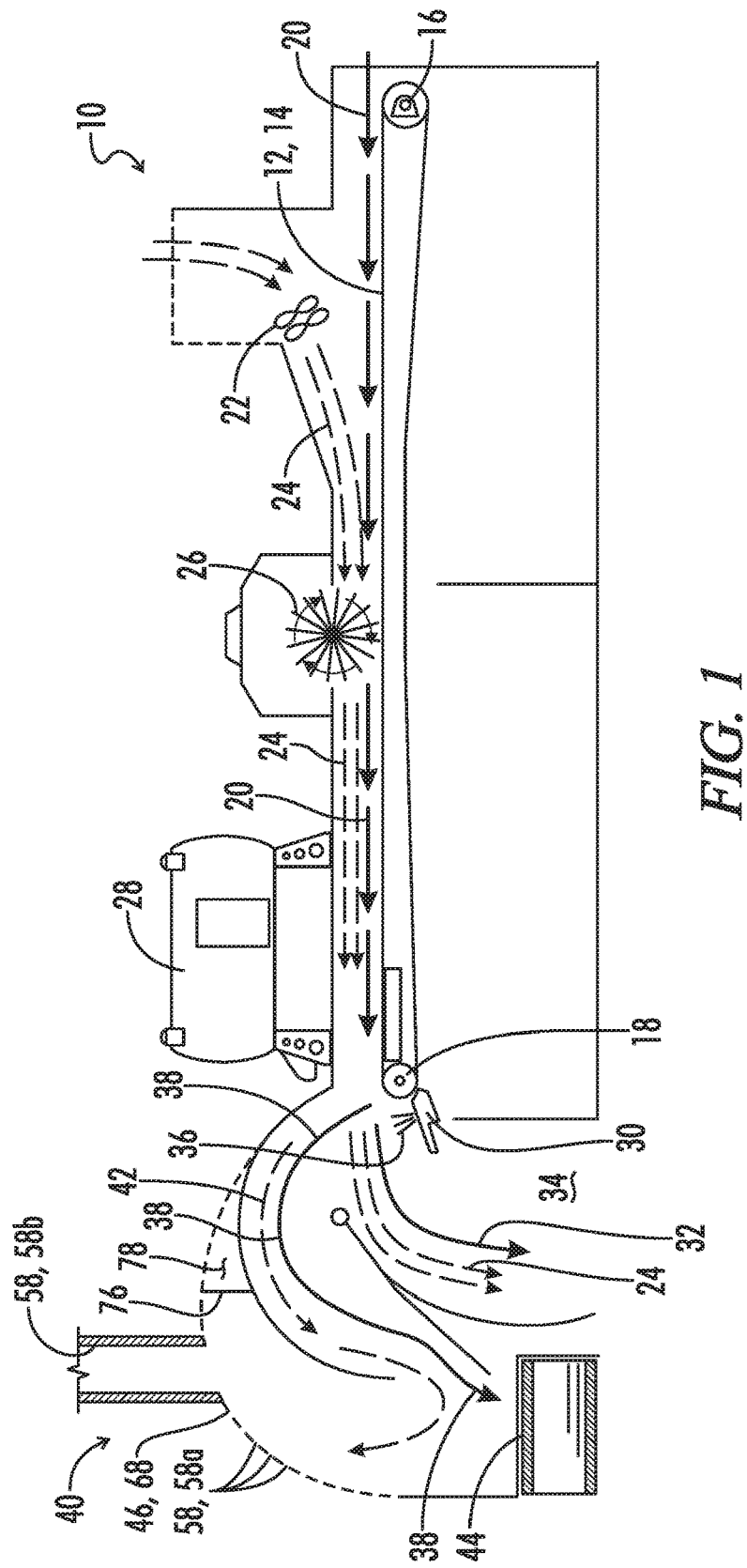
FIG. 1 is a schematic elevation cross-section drawing of a material sorting system, including one embodiment of the ejection hood of the present invention.

Referring now to the drawings, and particularly to FIG. 1, a material sorting system is shown and generally designated by the 10. The sorting system 10 includes a primary sorting conveyor 12 which may be an endless belt 14 driven by rollers such as 16 and 18.

A stream of material 20 represented by the arrows shown parallel to the conveyor 12 is carried on the conveyor 12 and in FIG. 1 is shown moving from right to left.

The stream of material 20 may for example be a mixed stream of household and office waste material including fibrous products such as office paper, newspaper and corrugated cardboard material and non-fibrous products such as plastic bags, metal cans, bottles, glass particles, and various plastic articles and other waste material. In the example described herein, it is assumed that the stream of material 20 includes fibrous materials which are desired to be separated out for recycling, and also includes non-fibrous material such as plastic bags, which are desired to be separated into a second waste stream.

In the embodiment shown, as the stream of material 20 moves from right to left, it is assisted in its movement by an over fire air assist stream provided by fan 22 and indicated by the double parallel dashed lines and arrows 24.

A pinning wheel 26 may be provided to ensure that the various materials in the stream of material 20 remain in contact with the belt 12 as the belt moves. The belt 12 may for example be moving at speeds of up to 1000 feet per minute.

As the stream of material 20 approaches the left hand end of the belt 12, it is examined by an optical sensing system 28, which determines the physical nature of each item of material in the stream 20, and identifies the location of each item within the stream 20.

When the stream of material 20 reaches the left-hand end of the conveyor 12 adjacent roller 18, the stream of material is launched off of the conveyor 12 into the air and passes over an upwardly directed air nozzle ejector array 30. Although the system illustrated provides optical sensing of the materials on the belt 12, it will be understood that the optical sensing system 28 may also be arranged to examine the materials in flight after the materials are launched off the end of the belt 12.

Those materials which are not acted on by a blast of air from the air nozzle ejector array 30 pass in a first separated stream 32, as indicated by the outwardly and downwardly curved arrow 32. Also, much of the air assist stream 24 follows the same general path, thus carrying the primary separated portion 32 of the stream of material 20 into a primary receptacle zone 34. The primary receptacle zone 34 may include a conveyor (not shown) for carrying the primary separated portion 32 to a desired location. The primary separated portion 32 may be in the present example, the fibrous materials such as paper and cardboard which are to be recycled.

When the optical sorting system 28 detects items within the stream of material 20 that are desired to be separated from the primary separated portion 32, for example, lightweight plastic bags and other plastic articles, the optical sorting system 28 will direct the air nozzle ejector array 30 to direct precisely timed and placed upwardly directed jets 36 of air against the underside of those articles thus pushing these articles into a secondary separated portion 38.

An ejection hood apparatus 40 is provided for transferring the materials of the secondary separated portion 38 along with a transfer airstream 42 formed by the air from the jets 36 from the air nozzle ejector array 30. The ejection hood apparatus 40 may direct the transfer airstream 42 and various ejected material making up the secondary separated portion 38 to an outlet conveyor 44. The outlet conveyor 44, may, for example, be a second belt conveyor extending at right angles to the primary sorting conveyor 12.

The ejection hood apparatus 40 includes a hood 46 defining an ejection chamber 48. The ejection chamber 48 includes a lower chamber portion 50 and an upper chamber portion 52 located above the lower chamber portion 50. Ejection chamber 48 may also be referred to as a receiving chamber 48.

The lower chamber portion 50 includes a laterally open chamber inlet 54 for receiving the transfer airstream 42, including the ejected material making up the secondary separated portion 38 of the materials from the stream of material 20. Although there is no precise dividing line between the upper chamber portion 52 and the lower chamber portion 50, the upper chamber portion 52 may generally be considered to be that portion of chamber 48 located higher than chamber inlet 54.

Figure 2:
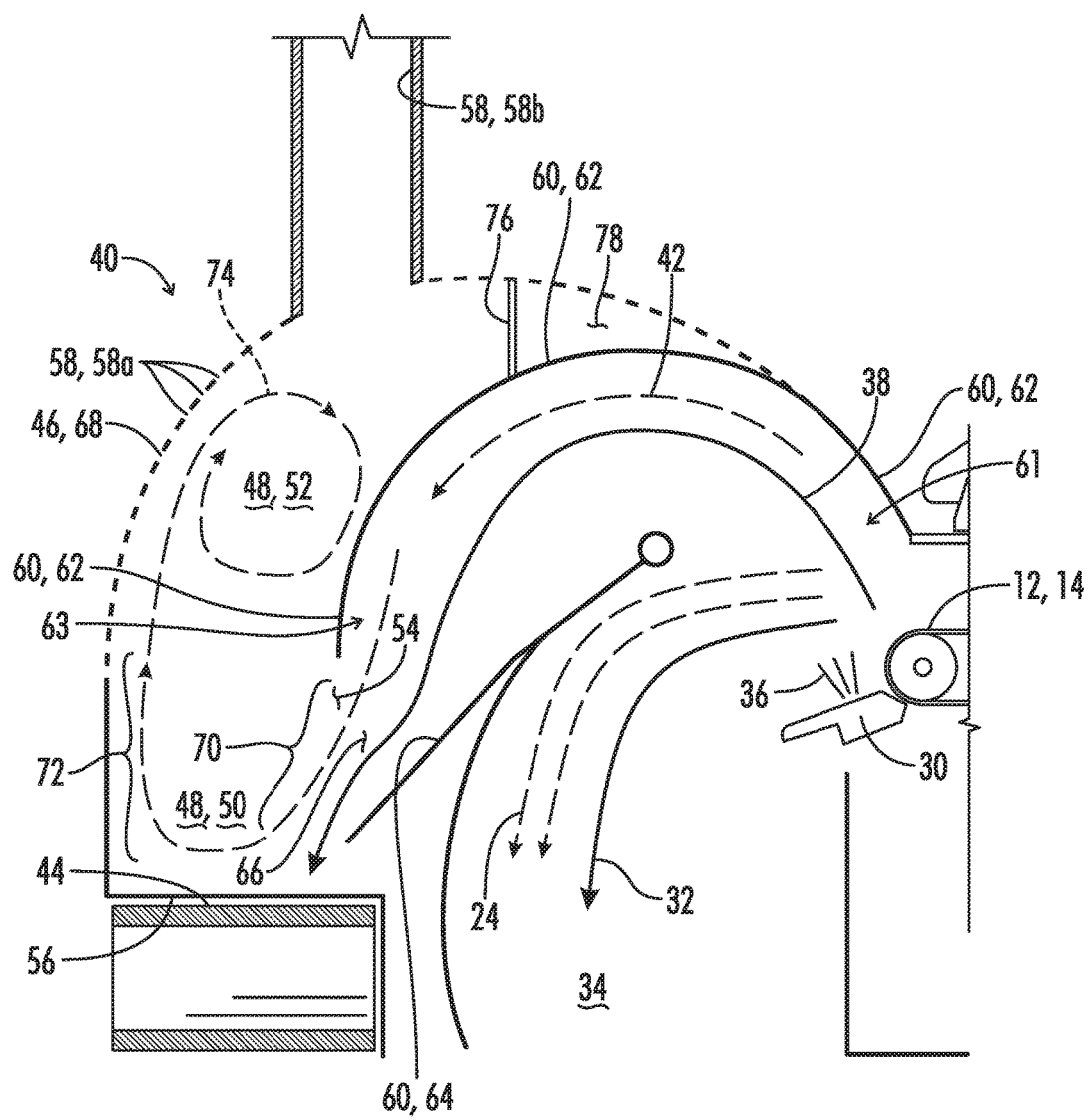
FIG. 2 is an enlarged view of the ejection hood portion of the apparatus of FIG. 1.

The lower chamber portion further includes a lower chamber outlet 56. The chamber outlet 56 is located lower than the chamber inlet 54. The hood 46 includes at least one air outlet passage 58. In the embodiment of FIGS. 1 and 2, the at least one air outlet passage 58 may be a plurality of perforations 58a formed in a metal plate portion of the hood 46. The perforations 58a allow at least a portion of the air from the transfer airstream 42 to be exhausted from the ejection chamber 48. Alternatively, or in addition to the perforations 58a, the at least one outlet passage 58 may include an exhaust duct 58b communicated with the hood 46. The exhaust duct 58b may be a preferred option if the nature of the entrained material is such that the smaller perforations 58a tend to be plugged by dirt and debris. The exhaust duct 58b may be oriented in any direction, and may include additional exhaust equipment such as fans or other suction devices (not shown).

The ejection hood apparatus 40 further includes a transfer conduit 60. The transfer conduit 60 may include a downwardly concave control shell 62 which is impervious to air so that there is no airflow across the control shell 62. The transfer conduit 60 may further include a conduit floor 64 located below the control shell 62 and sloped downwardly toward the ejection chamber 48. In the view of FIG. 2, the left hand ends of the conduit floor 64 and the control shell 62, at least in part define a conduit outlet 66 communicated with the chamber inlet 54. The transfer conduit 60 may include an inlet end portion 61 and an outlet end portion 63. The inlet end portion 61 may be configured to receive the transfer airstream 42 including ejected material 38 with at least a partially upward trajectory.

The downwardly concave control shell 62 may be a smoothly curved concave structure, or it may be formed from a series of straight sections, or it may be formed from a combination of straight and curved sections.

The hood 46 includes a downwardly concave upper hood portion 68, in part overlying the downwardly concave control shell 62 and in part overlying the chamber outlet 56. The concave upper hood portion 68 may be at least in part formed of perforated metal plate having the plurality of perforations 58a therein defining the air outlet passages 58 of the hood 46.

As seen in FIG. 2, the transfer conduit 60 and the hood 46 are configured such that the transfer air stream 42 flows downwardly and laterally through the chamber inlet 54 in an initial direction toward the chamber outlet 56 as indicated along the path portion 70. The transfer air stream 42 is at least partially deflected from the outlet conveyor 44 back up into the upper chamber portion 52, as generally indicated by the path portion 72, and then creates a swirling flow as generally indicated at 74 in the upper chamber portion 52. The swirling flow 74 may also be described as a vortex 74.

It is further noted that the downwardly and laterally directed air flow entering the chamber inlet 54 may be described as entering the lower chamber portion 50 substantially tangential to a volume of the lower chamber portion 50 thereby inducing the swirling flow in the chamber 48 generally. By this mechanism the kinetic energy of the air flow is transferred into the swirling vortex action and not into a disorganized turbulent flow. With the organized swirling flow the entrained materials can eventually fall out of the swirling flow due to gravity, and are not blown back through the chamber inlet 54 by random chaotic turbulent flow. This swirling flow may be described as an entrapment vortex in which the entrained materials are entrapped until they fall out due to the action of gravity.

It will be appreciated that the various path portions 70, 72 and 74 are only schematically illustrated. Lightweight materials from the secondary separated portion 38 of the stream of material 20 may be carried back upward with the transfer airstream 42 along the paths generally designated as 72 and 74, but when those materials are caught up in the swirling flow 74, they eventually will fall back downward by the effect of gravity through the lower chamber outlet 56 onto the outlet conveyor 44. The swirling flow 74 may also extend into the lower chamber portion 50.

It is noted that a barrier 76 may be provided in the upper chamber portion 52 to prevent entrained materials from being trapped in the narrow space, such as indicated at 78 over the apex of the downwardly concave control shell 62.

Thus the ejection hood apparatus 40 provides an organized airflow for the secondary separated portion 38 entrained in the transfer airstream 42 as that stream of air and entrained materials moves from the primary sorting conveyor 12 to the outlet conveyor 44. An organized swirling airflow is created within the ejection chamber 48, and particularly the upper portion 52 thereof such that the transfer airstream and particularly the materials entrained therein do not blow back through the transfer conduit 60.

The air outlet passages 58 provide a relief of air pressure in the top of the hood 46. Direct airflow against the perforated wall portion of the hood 46 is avoided so as to minimize materials sticking against the perforated portion of the hood 46.

Thus improved airflow is provided which allows for the efficient transfer of lightweight materials entrained in a transfer airstream from one conveyor to another at high speed without having the entrained materials blow back through the path communicating the transfer airstream with the transfer conveyor.

The embodiment illustrated in FIGS. 1 and 2 is what may be referred to as a "single eject" system in which the stream of material 20 is separated into two streams 34 and 38. A "dual eject" system (not shown) may also be used in which the stream of material is separated into three streams.

Figure 3:
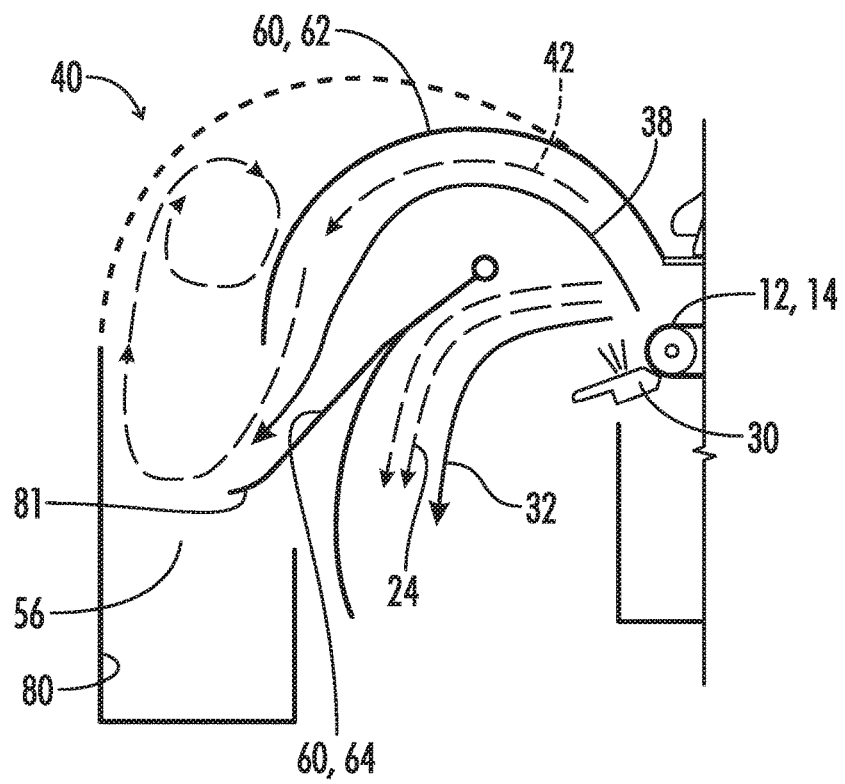
FIG. 3 is a view similar to FIG. 2, showing an alternative embodiment in which the separated material drops into a chute.

Embodiment of FIG. 3:

FIG. 3 shows an alternative embodiment wherein instead of having the chamber outlet 56 communicated with a conveyor such as 44, the chamber outlet 56 leads to an outlet chute or bin 80 in which the separated materials are collected. In FIG. 3 the conduit floor 64 may include an upwardly turned deflector portion 81 to aid in deflecting the incoming air stream 42 to create the swirling flow in the ejection chamber 48.

Figure 4:
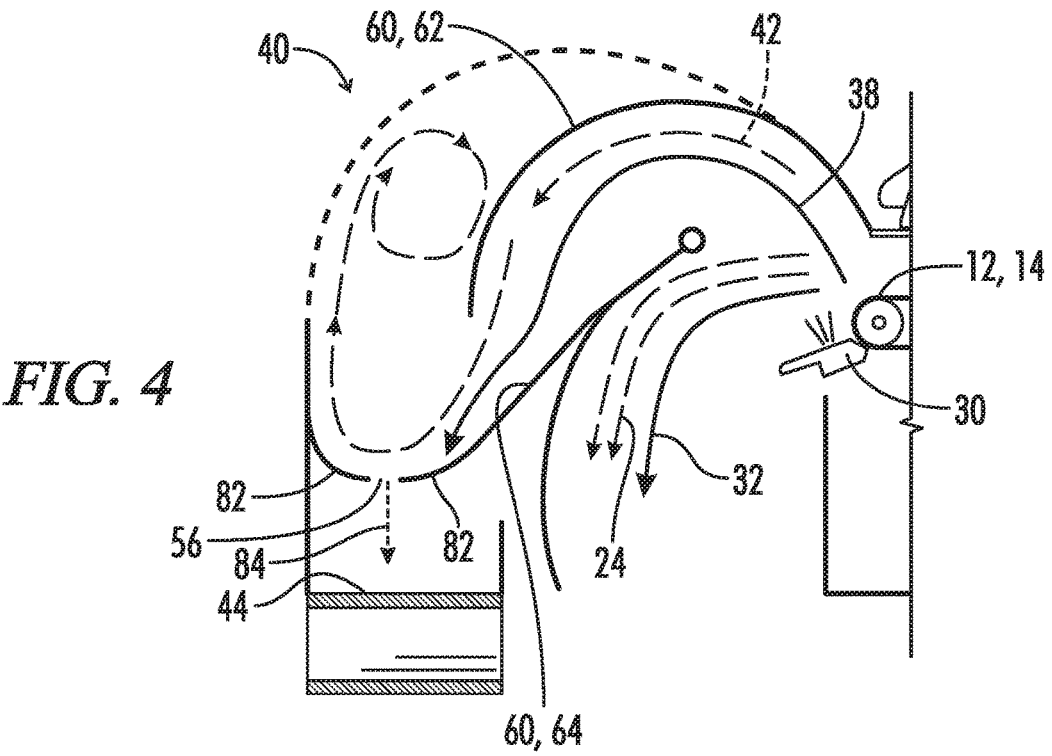
FIG. 4 is a view similar to FIG. 2, showing an alternative embodiment in which the chamber has an upwardly concave chamber floor.

Embodiment of FIG. 4:

FIG. 4 shows another alternative embodiment wherein the lower chamber portion 50 includes an upwardly concave chamber floor 82. The chamber outlet 56 is defined in a lower portion of the upwardly concave chamber floor 82. Separated materials may fall through the chamber outlet 56 as indicated at 84 onto the outlet conveyor 44 located therebelow. The upwardly concave chamber floor 82, particularly when curved as shown in FIG. 4, contributes to the generation of the swirling flow in the chamber 48.

Figure 5:
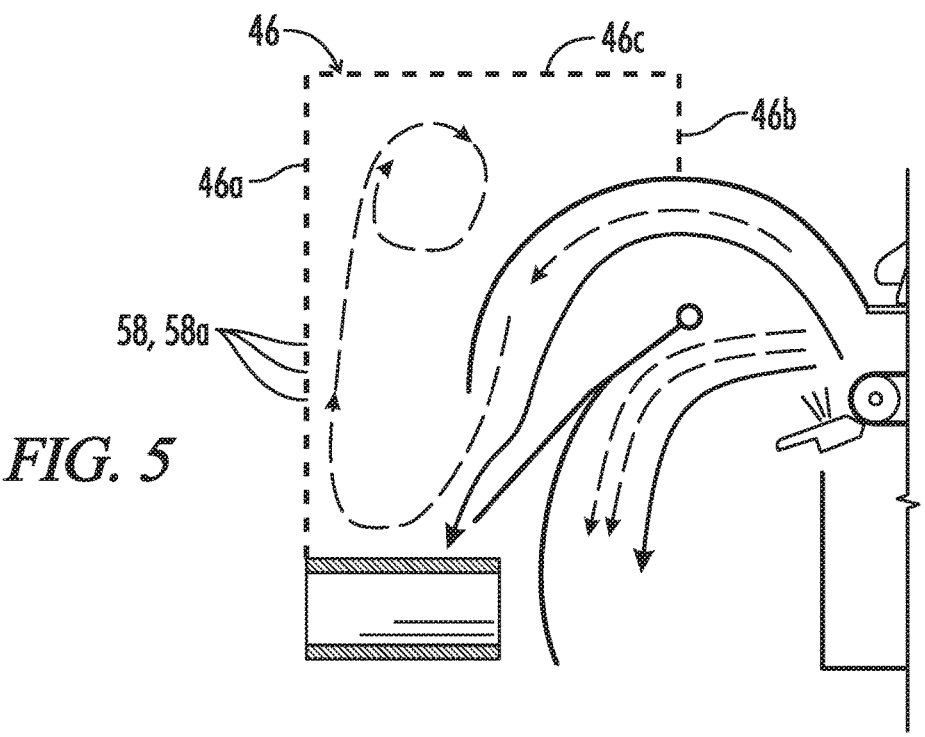
FIG. 5 is a view similar to FIG. 2, showing an alternative embodiment in which the hood has vertical walls and a horizontal top.

Embodiment of FIG. 5:

FIG. 5 shows another alternative embodiment in which the hood 46 is not arcuate shape, but instead includes substantially vertical end walls 46a and 46b and a substantially horizontal ceiling 46c. This embodiment also illustrates that the perforations 58*a* may extend along the entire height of the wall 46*a*, or any desired portion thereof.

Figure 6:
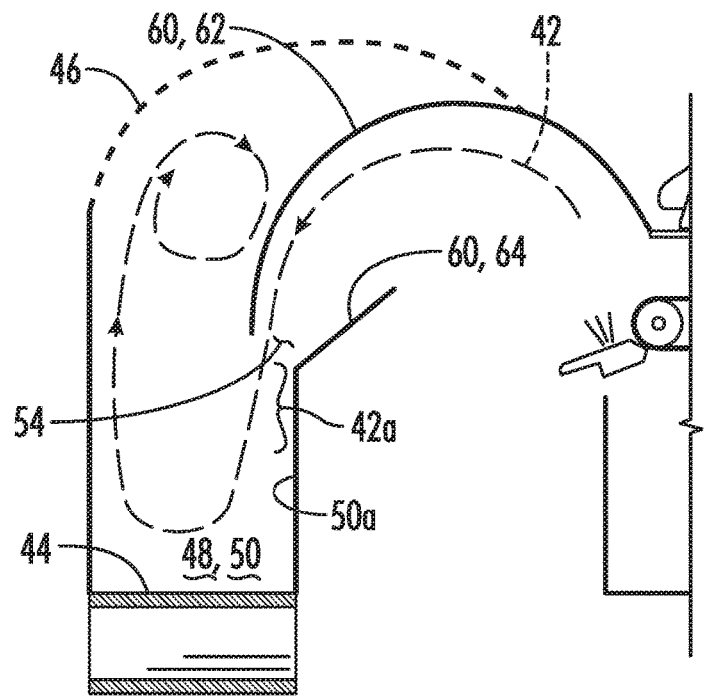
FIG. 6 is a view similar to FIG. 2, showing an alternative embodiment in which the chamber inlet is downwardly open.

Embodiment of FIG. 6:

FIG. 6 shows another alternative embodiment in which the transfer conduit 60 extends over a part of the lower chamber portion 50 so that the chamber inlet 54 is a downwardly open chamber inlet. Thus the transfer conduit 60 and the downwardly open chamber inlet 54 direct the transfer air stream 42 primarily downwardly as indicated at 42*a* into the lower chamber portion 50 adjacent an end 50*a* of the lower chamber portion 50. By primarily downwardly it is mean that the vector direction of the air flow is more downward than lateral.

With the primarily downwardly directed air stream 42 entering the lower chamber portion 50 adjacent end 50*a* of the lower chamber portion, the air stream 42 may be described as entering the lower chamber portion 50 substantially tangential to a volume of the lower chamber portion 50 thereby inducing the swirling flow in the chamber 48 generally.

It is noted that although FIGS. 3-6 do not show the exhaust duct 58*b* of FIGS. 1 and 2, any of the alternative embodiments of FIGS. 3-6 may include the exhaust duct 58*b* in addition to or instead of the perforations 58*a*.

It is also noted that the various optional features of FIGS. 3-6 may be used with each other in any desired combination.

Methods of Operation

The operation of the material sorting system 10, and particularly the ejection hood apparatus 40 thereof provides a method including the steps of:

(a) providing on a conveyor 12 a stream of material 20 to be sorted;

(b) launching the stream of material 20 off of the conveyor 12 thus creating an airborne stream of material 32;

(c) ejecting material 38 from the airborne stream of material with the nozzle array 30 directed at least partially upwardly thereby creating a transfer air stream 42 including the entrained material 38;

(d) directing the transfer air stream 42 including entrained material 38 through a chamber inlet 54 into a receiving chamber 48;

(e) creating a swirling air flow of the transfer air stream in the receiving chamber 48 so that the swirling air flow does not flow back through the chamber inlet 54;

(f) dropping entrained material out of the swirling air flow downward onto an outlet conveyor 44; and (g) relieving at least some of the swirling air flow through an airflow outlet 58 defined in an upper portion 52 of the receiving chamber.

The directing of the transfer airstream 42 may be performed by the transfer conduit 60.

With the embodiment of FIGS. 1 and 2 the transfer air stream is directed downwardly and laterally through the chamber inlet 54 into the receiving chamber 48.

With the embodiment of FIG. 6 the transfer air stream is directed primarily downwardly into the receiving chamber 48 adjacent the end 50*a* of the lower portion 50 of the receiving chamber 48.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An ejection hood apparatus, comprising
a transfer conduit including a downwardly concave control shell, the transfer conduit including an inlet end portion and an outlet end portion, the inlet end portion being configured to receive an upwardly directed transfer air stream including ejected material with at least a partially upward trajectory; and
a hood defining an ejection chamber, the ejection chamber including a lower chamber portion and an upper chamber portion located above the lower chamber portion, the lower chamber portion including a chamber inlet for receiving the transfer air stream from the outlet end portion of the transfer conduit with at least a partially downward trajectory, the lower chamber portion further including a lower chamber outlet located lower than the chamber inlet, the hood including at least one air outlet passage communicated with the upper chamber portion for exhausting at least a portion of the transfer air stream;
wherein the chamber inlet is a laterally open chamber inlet.

2. The apparatus of claim 1, further comprising:
an outlet conveyor received below the chamber outlet; and
wherein the transfer conduit and hood are configured such that the transfer air stream flows through the chamber inlet toward the chamber outlet and is at least partially deflected from the outlet conveyor back up into the upper chamber portion creating a swirling flow in the upper chamber portion above the outlet conveyor so that ejected material caught up in the swirling flow drops back down through the lower chamber portion onto the outlet conveyor without being blown back into the transfer conduit.

3. The apparatus of claim 1, wherein:
the transfer conduit includes a conduit floor located below the control shell and sloped downwardly toward the ejection chamber, the conduit floor and control shell at least in part defining a conduit outlet communicated with the chamber inlet.

4. An ejection hood apparatus, comprising
a transfer conduit including a downwardly concave control shell, the transfer conduit including an inlet end portion and an outlet end portion, the inlet end portion being configured to receive an upwardly directed transfer air stream including ejected material with at least a partially upward trajectory; and
a hood defining an ejection chamber, the ejection chamber including a lower chamber portion and an upper chamber portion located above the lower chamber portion, the lower chamber portion including a chamber inlet for receiving the transfer air stream from the outlet end portion of the transfer conduit with at least a partially downward trajectory, the lower chamber portion further including a lower chamber outlet located lower than the chamber inlet, the hood including at least one air outlet passage communicated with the upper chamber portion for exhausting at least a portion of the transfer air stream;
wherein the transfer conduit includes a conduit floor located below the control shell and sloped downwardly toward the ejection chamber, the conduit floor and control shell at least in part defining a conduit outlet communicated with the chamber inlet; and wherein the hood includes an upper hood portion in part overlying the downwardly concave control shell and in part overlying the chamber outlet.

5. The apparatus of claim 4, wherein:
the upper hood portion is at least in part formed of perforated metal plate having a plurality of perforations defining the at least one air outlet passage of the hood.

6. The apparatus of claim 4, wherein the upper hood portion is downwardly concave.

7. The apparatus of claim 1, wherein:
the control shell is impervious to air so that there is no air flow across the control shell.

8. The apparatus of claim 1, wherein:
the transfer conduit and the laterally open chamber inlet are configured to direct the transfer air stream downwardly and laterally through the chamber inlet into the lower chamber portion.

9. An ejection hood apparatus, comprising
a transfer conduit including a downwardly concave control shell, the transfer conduit including an inlet end portion and an outlet end portion, the inlet end portion being configured to receive an upwardly directed transfer air stream including ejected material with at least a partially upward trajectory; and
a hood defining an ejection chamber, the ejection chamber including a lower chamber portion and an upper chamber portion located above the lower chamber portion, the lower chamber portion including a chamber inlet for receiving the transfer air stream from the outlet end portion of the transfer conduit with at least a partially downward trajectory, the lower chamber portion further including a lower chamber outlet located lower than the chamber inlet, the hood including at least one air outlet passage communicated with the upper chamber portion for exhausting at least a portion of the transfer air stream;
wherein the chamber inlet is a downwardly open chamber inlet.

10. The apparatus of claim 9, wherein:
the transfer conduit and the downwardly open chamber inlet are configured to direct the transfer air stream primarily downwardly into the lower chamber portion adjacent one end of the lower chamber portion.

11. The apparatus of claim 1, wherein:
the lower chamber portion includes an upwardly concave chamber floor, the chamber outlet being defined in a lower portion of the upwardly concave chamber floor.

12. The apparatus of claim 1, wherein:
the at least one air outlet includes an exhaust duct extending from the hood.

13. The apparatus of claim 1, further comprising:
a primary sorting conveyor arranged to deliver a stream of material to be sorted in a layer of objects one object thick; and
an upwardly directed air nozzle ejector array arranged to eject from the stream of material selected material into the inlet end portion of the transfer conduit thereby creating the transfer air stream including ejected material.

* * * * *

UNITED STATES PATENT AND TRADEMARK OFFICE
CERTIFICATE OF CORRECTION

PATENT NO. : 10,131,507 B1
APPLICATION NO. : 15/661180
DATED : November 20, 2018
INVENTOR(S) : Arthur G. Doak It is certified that error appears in the above-identified patent and that said Letters Patent is hereby corrected as shown below:

In the Specification

Column 7, Line 12, replace "mean" with --meant--.

Signed and Sealed this
Twenty-ninth Day of January, 2019

Andrei Iancu
*Director of the United States Patent and Trademark Office*